United States Patent
Duchateau et al.

(10) Patent No.: US 6,719,350 B2
(45) Date of Patent: Apr. 13, 2004

(54) COMPENSATOR FOR A LACK OF PARALLELISM IN A REMOVABLE VEHICLE SEAT

(75) Inventors: Jean Duchateau, Pont Salomon (FR); Gérard Basson, Roche la Molière (FR); Nordine Hamtache, Firminy (FR)

(73) Assignee: Grupo Antolin-Ingenieria, S.A. (ES)

( * ) Notice: Subject to any disclaimer, the term of this patent is extended or adjusted under 35 U.S.C. 154(b) by 0 days.

(21) Appl. No.: 10/385,590

(22) Filed: Mar. 11, 2003

(65) Prior Publication Data

US 2003/0173794 A1 Sep. 18, 2003

(30) Foreign Application Priority Data

Mar. 15, 2002 (FR) .............................................. 02 03498

(51) Int. Cl.⁷ ................................................. B60N 2/44
(52) U.S. Cl. .............................. 296/65.13; 297/452.2; 296/65.01
(58) Field of Search ........................ 296/65.01, 65.13, 296/65.14; 297/452.18, 452.2

(56) References Cited

U.S. PATENT DOCUMENTS 5,685,614 A * 11/1997 Chabanne ................ 297/452.2
6,227,595 B1 * 5/2001 Hamelin et al. ......... 296/65.03
6,357,814 B1 * 3/2002 Boisset et al. ........... 296/65.03
6,648,394 B2 * 11/2003 Lejeune et al. .......... 296/65.13

FOREIGN PATENT DOCUMENTS

| DE | 43 08 015 | 9/1994 |
|----|-----------|--------|
| EP | 0 783 990 | 7/1997 |
| FR | 2 812 251 | 2/2002 |

* cited by examiner

Primary Examiner—Dennis H. Pedder
(74) Attorney, Agent, or Firm—Cantor Colburn LLP

(57) ABSTRACT

A compensator for lack of parallelism in a removable seat is provided, the seat including two rigid lateral endplates, crossmembers connecting the endplates, means of positioning the endplates in a slideway fixed to a floor of the vehicle, translational guidance means, and means of locking the endplates in the slideway, the crossmembers being tubular and cylindrical and collaborating with bearings of the endplates, the compensator including a cylindrical and stepped axial endpiece disposed at an end of each of the crossmembers, a sleeve made of viscoelastic material pushed tightly into the bearing in the corresponding endplate, the sleeve receiving the endpiece, an axial tapped hole for a screw for translational immobilization pressing a washer against an outer end face of the sleeve and an inner end face of the sleeve against the flange of the endpiece.

3 Claims, 3 Drawing Sheets

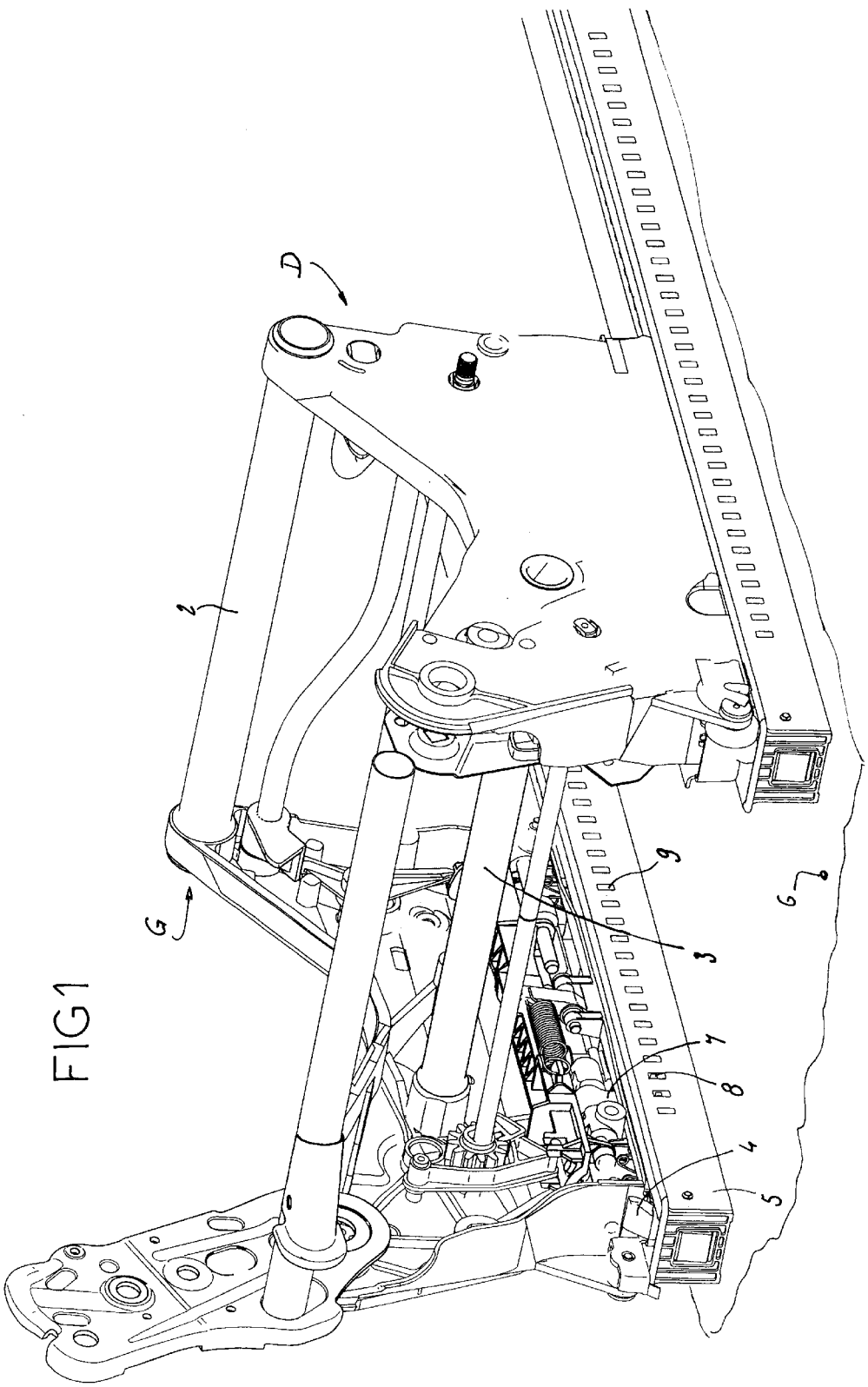

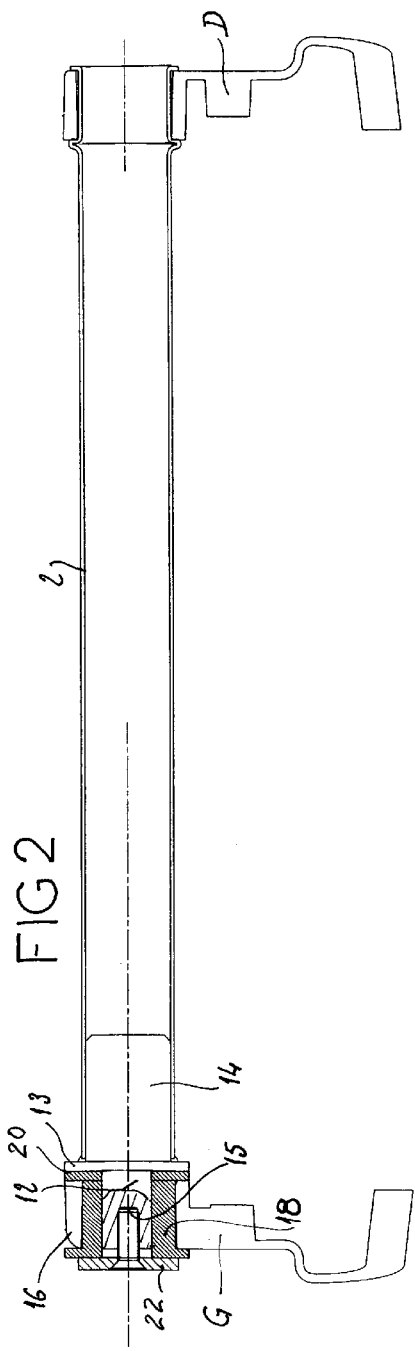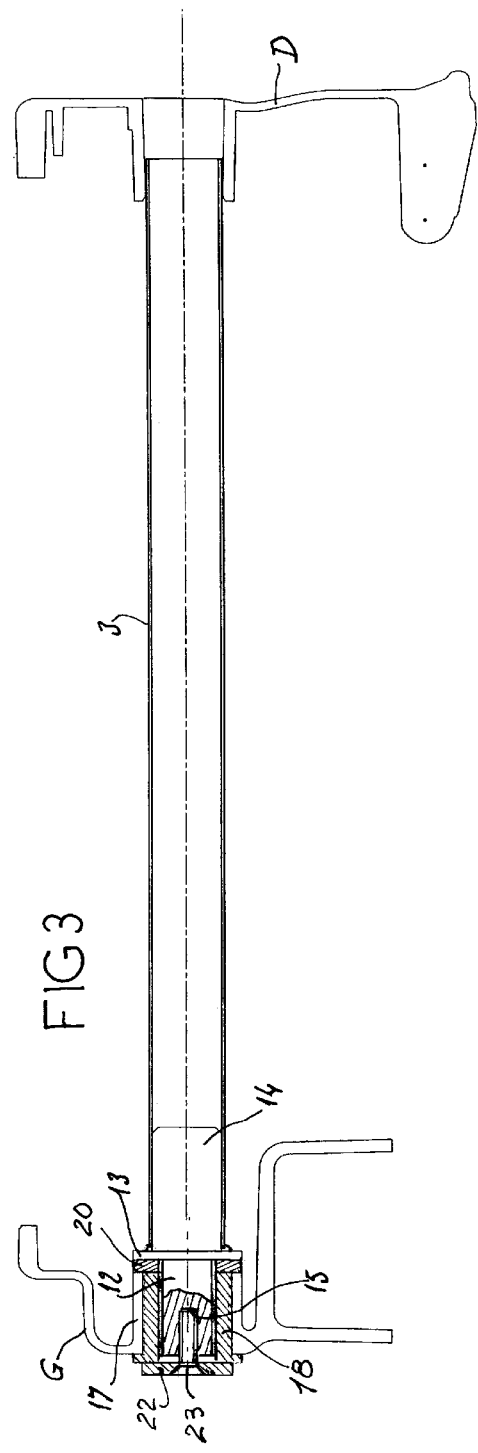

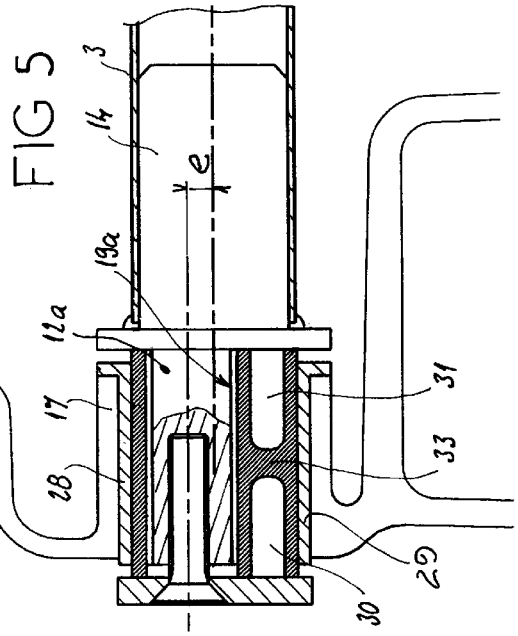
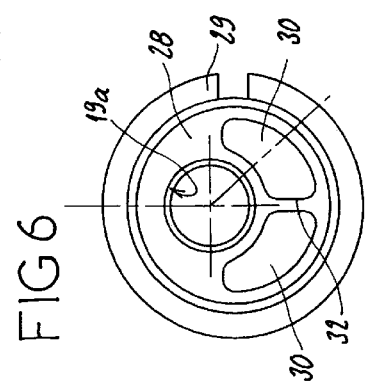
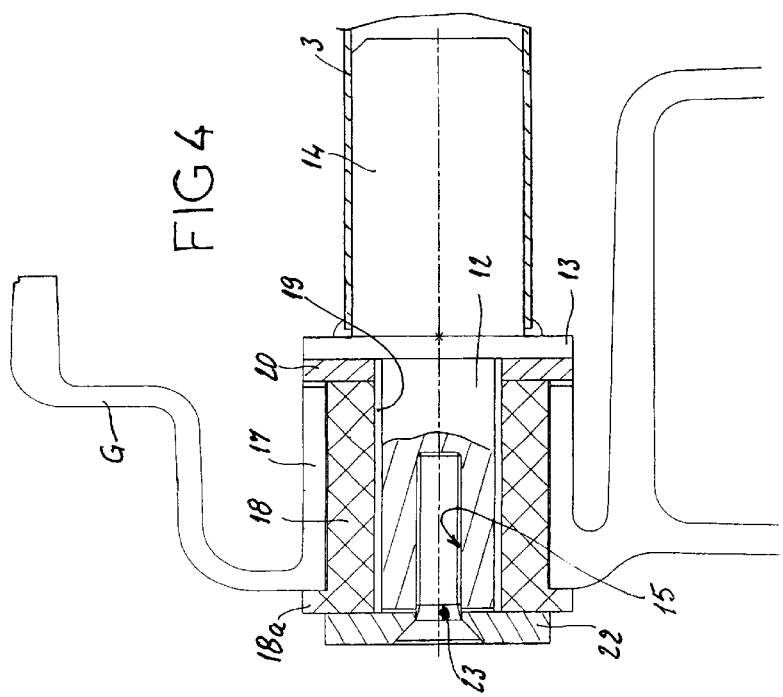

COMPENSATOR FOR A LACK OF PARALLELISM IN A REMOVABLE VEHICLE SEAT

BACKGROUND OF THE INVENTION AND DESCRIPTION OF THE PRIOR ART

The invention relates to a compensator for a lack of parallelism in a removable vehicle seat.

It relates to motor vehicle seats and, more particularly, to removable seats comprising, on the one hand, means of anchorage to longitudinal slideways fixed to the floor of the vehicle and, on the other hand, means allowing their longitudinal position to be adjusted and allowing them to be locked in the chosen position.

In these seats, the sitting structure is secured to an underframe formed of two subassemblies, namely a right and a left subassembly, each comprising means of positioning with respect to the corresponding slideway, means of guidance in transverse and longitudinal translation with respect to the slideway, means of locking on the slideway, such as articulated bolts or catches collaborating with complementary means on the slideway, such as returns, teeth or notches.

In spite of the care taken when manufacturing and fitting the slideways, and also the underframes of each seat, the build-up of manufacturing tolerances may, for certain seat/slideway combinations, lead to jamming during, or portions offering greater resistance to, the longitudinal displacement of a seat underframe in the slideways.

In addition, over time, deformation to the floor may adversely affect the relative positions of two initially parallel slideways, giving them the shape of a "V" in plan view from above, and/or a different inclination with respect to the plane of the floor, that is to say may generate new conditions adversely affecting the sliding, and possibly even the return to its position when positioning the seat.

These disadvantages are encountered all the more when a passenger seat can occupy any position on the floor, because then the defects of the slideways combine with the defects of the seats.

Considering that the subassemblies, namely the right and left subassemblies, of the sitting structure, are connected rigidly to one another by crossmembers, the applicant company, in its French Patent Application published under the number 2 812 251 proposes to remedy these parallelism defects by equipping one of the endplates with at least one carriage which, on the one hand, is mounted so that it floats in terms of transverse translation with respect to this endplate and, on the other hand, is connected to the latter by a single transverse axle with the possibility of pivoting in the vertical plane.

SUMMARY OF THE INVENTION

The present invention aims to remedy these parallelism defects using a simpler less expensive compensator that can be applied to all seats in which the sitting structure of the seat comprises two rigid lateral endplates connected by crossmembers.

According to the invention, each of the crossmembers connecting the endplates of the seat is equipped, at least at one of its ends, with a cylindrical and stepped axial endpiece via which it is engaged with radial clearance in a sleeve made of viscoelastic material itself pushed tightly into a bearing in the corresponding endplate, said endpiece being equipped with an axial tapped hole for a screw for translational immobilization pressing a washer against the outer end face of the sleeve and the other end face of the sleeve against the flange of said endpiece.

Thus, when there is a parallelism defect in the connection between a seat and its two slideways, whether this be during engagement of the seat in its slideways or as the seat is displaced therein, the reaction forces imparted to the two endplates are compensated for, and at least partially absorbed, by the deformation of the viscoelastic sleeves. This deformation, which does not affect the connection between the two endplates, allows these to modify their relative position and eliminate any jamming of their carriage or running in the slideways.

BRIEF DESCRIPTION OF THE DRAWINGS

Other features and advantages will become apparent from the description which follows with reference to the attached schematic drawing.

FIG. 1 is a perspective part view with cutaway showing the sitting structure of a seat, FIGS. 2 and 3 are views in longitudinal section of two of the crossmembers of the seat, each showing a first embodiment of the compensator, FIG. 4 is a view, on a larger scale, of the left-hand part of FIG. 3, FIG. 5 is a view similar to FIG. 4, and showing another embodiment of the compensating sleeve, FIG. 6 is an end-on front view of the compensating sleeve depicted in FIG. 5.

DESCRIPTION OF THE PREFERRED EMBODIMENTS

As shown in FIG. 1, the invention relates to seats in which the sitting structure comprises two lateral endplates, namely a left endplate G and a right endplate D, which are connected together by tubular crossmembers and, in this instance, by a front crossmember 2 and a rear crossmember 3. Each endplate bears means 4 of positioning in a slideway 5 fixed to the floor 6 of the vehicle, means of guidance in translation in this slideway, these means not being depicted, and locking means consisting, for example, of levers 7 the fingers 8 of which enter notches 9 formed in the flanges of the slideway. A single control, not depicted here, causes the levers 7 of each of the endplates G and D to pivot to unlock the sitting structure from the slideways to allow it to be displaced with respect to the slideways or to bring the levers into a position that allows the structure to be extracted from the slideway. As these various means are well known in the state of the art and are independent of the invention, they do not need to be described further in detail.

In the embodiment depicted in FIGS. 2 and 3, each of the crossmembers 2 and 3 is positively connected by one of its ends, in this instance its right-hand end, to the corresponding endplate D. At its other end, it comprises a cylindrical endpiece 12, stepped on account of a flange 13 and secured to a push-fitting part 14 via which it is pushed into the free end of the crossmember 2. The endpiece 12 has an axial tapped hole 15.

The part of the endplate G collaborating with the end of each of the crossmembers 2 and 3 is set out in the form of a bearing 16 in FIG. 2, 17 in FIG. 3. As shown on a larger scale in FIG. 4, each of these bearings is intended, as a tight push fit, to house a viscoelastic sleeve 18 the internal bore 19 of which has a larger diameter than the endpiece 12.

In the embodiment depicted, the sleeve 18 is in the shape of a cylindrical socket and is equipped on its outer end with a flange 18a. Its inner end presses against a washer 20, made of viscoelastic material, arranged around the endpiece 12 and interposed between the flange 13 of the endpiece and the end face of the bearing 17 housing the sleeve 18.

These various elements are immobilized in terms of translation by a metal washer 22 which is pressed against the outer end face of the sleeve 18 by an axial screw 23 screwed into the tapped axial hole 15. Tightening the screw also, via the sleeve 18, causes the washer 20 to be pressed firmly against the flange 13.

FIGS. 2 and 3 show that, except for the general form of the bearings 16 and 17, the means employed are identical for both crossmembers 2 and 3.

When the endplates are subjected, in the vertical plane or the horizontal plane, to forces resulting from defects of parallelism between the two slideways or between the sitting structure and the slideways, these defects are automatically compensated for by elastic deformation of the sleeves 18 and/or of the washer 20. By virtue of this viscoelastic nature of the sleeves 18, this deformation takes place noiselessly and elastically, so that the endplates G and D can return to their original position if the seat is displaced again or removed.

Although contriving an elastic articulation at just one of the ends of each of the crossmembers 2 and 3 is enough to compensate for defects in parallelism between the seat structure and the slideways, it is also possible, in very elaborate designs with wider manufacturing tolerances, to use elastic articulations at each of the ends of the crossmembers.

In the embodiment depicted in FIGS. 5 and 6, the viscoelastic sleeve 28 maintains its cylindrical external shape but is pushed into a metal ring 29 and has a bore 19a for the endpiece 12a which is offset by $e$ from the axis of the sleeve.

In the embodiment depicted, the endpiece 12a is also offset from the axis of the crossmember 3, but may also be coaxial with the axis thereof and with its push-fitting part 14. The offset of the bore 19a in the sleeve 28 makes it possible, in this sleeve, to form a region of greater radial thickness in which at least one and, in the embodiment depicted, several, cavities 30 are made, opening onto each of the end faces of the sleeve 28.

In the embodiment depicted, two cavities 30 open onto the outer end face and two cavities 31 open onto the inner end face. Each of the cavities is separated from the one next to it by a thin web of material 32 and is separated, by a thin web of material 33, from the cavity arranged in the continuation of it.

FIG. 5 shows that this elastic articulation is mounted in the same way as the previous one, as a tight push fit into the bearing 17 and with radial clearance with respect to the endpiece 12a. The presence of the cavities 30, 31 gives the sleeve a greater ability to deform elastically and also allows it to absorb greater parallelism defects.

What is claimed is:

1. A compensator for lack of parallelism in a removable vehicle seat including two rigid lateral endplates, crossmembers connecting the endplates, means of positioning the endplates in a slideway fixed to a floor of the vehicle, translational guidance means, and means of locking the endplates in the slideway, the crossmembers being tubular and cylindrical and collaborating with bearings of the endplates, the compensator comprising:

a cylindrical and stepped axial endpiece disposed at an end of each of the crossmembers;

a sleeve made of viscoelastic material pushed tightly into the bearing in the corresponding endplate, the sleeve receiving the endpiece;

an axial tapped hole formed in the endpiece;

a screw received in the hole for translational immobilization pressing an outer washer against an outer end face of the sleeve and an inner end face of the sleeve toward a flange of the endpiece.

2. The compensator as claimed in claim 1, wherein the flange of the endpiece has, bearing thereagainst, an inner washer made of a viscoelastic material inserted between the flange and the inner end face of the viscoelastic sleeve.

3. The compensator as claimed in claim 1, wherein the viscoelastic sleeve comprises a bore for receiving the endpiece of the crossmember, the bore being offset from a longitudinal axis of the sleeve to form a region of greater radial thickness in which there is formed at least one cavity for increasing the elastic deformability of the sleeve, said cavity opening onto at least one of the end faces of the sleeve.

\* \* \* \* \*